F. M. FUNDIS.
NUT LOCKING DEVICE.
APPLICATION FILED SEPT. 1, 1911.
1,017,401.
Patented Feb. 13, 1912.
FIG. 1
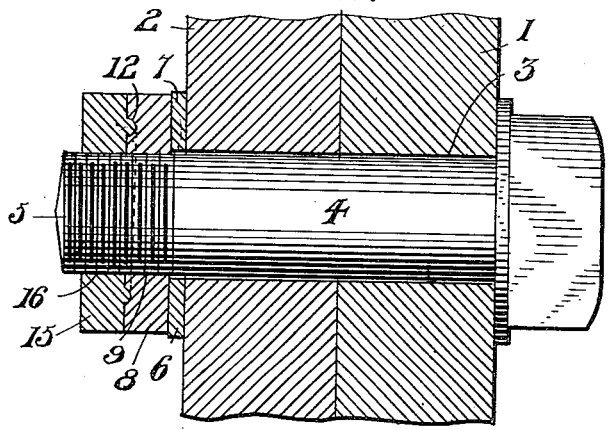
FIG. 2  FIG. 3  FIG. 4  FIG. 5
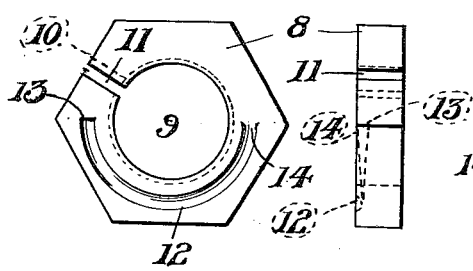 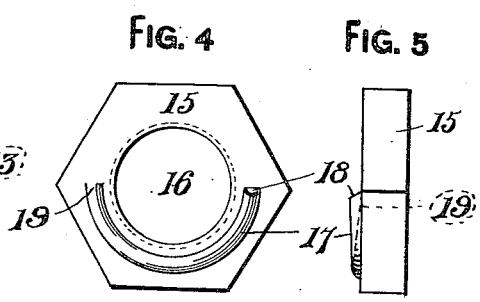
FIG. 6  FIG. 7
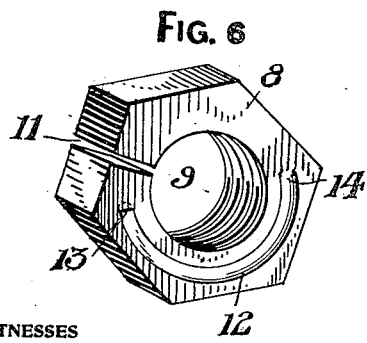 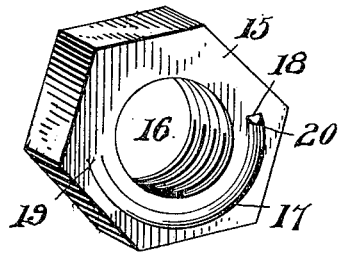
WITNESSES
INVENTOR
Fredrick M. Fundis
BY
ATTORNEYS

UNITED STATES PATENT OFFICE.

FREDERICK M. FUNDIS, OF NEW KENSINGTON, PENNSYLVANIA.

NUT-LOCKING DEVICE.

1,017,401.

Specification of Letters Patent.

Patented Feb. 13, 1912.

Application filed September 1, 1911. Serial No. 647,137.

*To all whom it may concern:*

Be it known that I, FREDERICK M. FUNDIS, a citizen of the United States of America, residing at New Kensington, in the county of Westmoreland and State of Pennsylvania, have invented certain new and useful Improvements in Nut-Locking Devices, of which the following is a specification, reference being had therein to the accompanying drawing.

This invention relates to nut locking devices, and the objects of my invention are to provide:—First, a device that can be advantageously used in connection with rail joints, bridges, rolling stock and structures subjected to vibrations that have a tendency to displace nuts from bolts, tie rods, pins and other structures. Second, a device that is positive in its action, not liable to injury by ordinary use, and easily installed by unskilled labor. Third, a sectional nut having simple and effective means for binding one of said sections upon a bolt. Fourth, a nut locking device consisting of comparatively few parts inexpensive to manufacture and highly efficient for the purposes for which it is intended.

I attain the above objects by a mechanical construction that will be hereinafter specifically described and then claimed, and reference will now be had to the drawing, wherein like numerals of reference designate corresponding parts throughout the several views, in which:—

Figure 1 is a longitudinal sectional view of the nut lock, Fig. 2 is a front elevation of a detached split section of the nut lock, Fig. 3 is a side elevation of the same, Fig. 4 is a front elevation of a detached locking section of the nut lock, Fig. 5 is a side elevation of the same, Fig. 6 is a perspective view of the split section of the nut lock, and Fig. 7 is a perspective view of the locking section thereof.

The reference numerals 1 and 2 denote, by the way of an example, two pieces of material having alining openings 3 to receive a bolt 4, said bolt having the threaded end 5 thereof protruding from the piece of material 2.

The reference numeral 6 denotes a washer that is mounted against the piece of material 2, said washer having an opening 7 to receive the bolt 4.

8 denotes a split nut section having an opening 9 with the walls thereof threaded, as at 10 whereby said nut section can be screwed upon the threaded end 5 of the bolt to engage the washer 6. The nut section 8 has a radially disposed slit or slot 11 and the outer face of the section 8 has a semi-circular groove 12. The groove 12 has its greatest depth at the end 13 thereof. The groove 12 gradually decreases in depth from the end 13 to the opposite end 14 where it merges into the outer face of the nut section 8. The end 14 of the groove is located diametrically opposite the end 13 of the groove, and the end 13 is in greater proximity to the wall of the opening 9 than the end 14 of said groove, the object of which will presently appear.

Associated with the split section 8 is a locking nut section 15 having an opening 16 with the walls thereof screw threaded whereby said locking nut section can be screwed upon the threaded end 5 of the bolt 4 against the section 8. The inner face of the nut locking section 15 has a semi-circular rib 17 corresponding in length to the groove 12, said rib gradually tapering from the end 18 thereof to the end 19 which merges into the inner face of the nut locking section 15. The end 18 of the rib 17 is beveled, as at 20 to enable the convenient entering of the rib into the groove 12.

When the nut locking section 15 is screwed against the split section 8, the rib 17 rides into the groove 12 and as it rides into said groove, the split section 8 is shifted whereby the threads 10 of the split section 8 will bind upon the threaded end of the bolt 4. This action is caused by the end 14 of the groove 12 being removed a greater distance from the edge of the opening 9 than the end 13 of the groove, consequently the screwing of the nut section 15 tends to shift the split section 8 sidewise, thereby binding the threads of the nut 8 against the threads of the bolt 4, particularly at the split side of the nut section 8. In tapering the depth of the groove 12 and the depth of the rib 17, said rib can readily ride into said groove and perform the action described above.

From the foregoing it will be observed that I have devised a sectional nut wherein said sections are constructed in a manner that will permit of one of said sections being shifted independently of the other section, and it is this shifting of the one section that produces a clamping action that firmly retains the sectional nut upon the bolt.

What I claim is:—

1. In a nut locking device, the combination with a bolt, of a sectional nut screwed upon said bolt, one of said sections having a radially disposed split and the outer side thereof provided with a semi-circular groove with one end of said groove in closer proximity to the opening of said nut than the opposite end, and the other section of said nut having the inner face thereof provided with a semi-circular rib adapted to ride into the groove of the split section of said nut and produce a sidewise movement of the split section of said nut that tends to clamp said split section upon said bolt.

2. In a nut locking device, the combination with a bolt, of a sectional nut screwed upon said bolt, one section of said nut having a radially disposed slit and the outer side thereof provided with a semi-circular groove tapering in depth from one end thereof to the opposite end and disposed eccentrically with respect to the bolt opening, and a semi-circular rib carried by the inner face of the other section of said nut and tapering from one end thereof to the opposite end whereby said rib can easily ride into the groove of the other section of said rib and producing a sidewise movement of the split section of said nut, whereby said split section will clamp upon the bolt.

In testimony whereof I affix my signature in the presence of two witnesses.

FREDERICK M. FUNDIS.

Witnesses:
REYNOLDS LAUGHLIN,
WILLIAM KERVY.